United States Patent [19]

Fritze

[11] 4,233,322
[45] Nov. 11, 1980

[54] MANUFACTURING OF INSTANT PRODUCTS FROM LEGUMES

[75] Inventor: Hartwig Fritze, Weingarten, Fed. Rep. of Germany

[73] Assignee: Escher Wyss Limited, Zurich, Switzerland

[21] Appl. No.: 906,610

[22] Filed: May 16, 1978

[30] Foreign Application Priority Data

May 25, 1977 [CH] Switzerland .................. 006433/77

[51] Int. Cl.³ .................................................. A23L 1/20
[52] U.S. Cl. ..................................... 426/46; 426/589; 426/634
[58] Field of Search ............... 426/46, 634, 52, 589, 426/507

[56] References Cited

U.S. PATENT DOCUMENTS

| | | | |
|---|---|---|---|
| 3,876,807 | 4/1975 | Wagner et al. | 426/46 |
| 3,941,890 | 3/1976 | Drachenberg et al. | 426/46 |
| 4,035,516 | 7/1977 | Jungvid | 426/46 X |
| 4,119,733 | 10/1978 | Hsieh et al. | 426/46 |

FOREIGN PATENT DOCUMENTS

1380477 1/1975 United Kingdom .
1446965 8/1976 United Kingdom .

Primary Examiner—Robert A. Yoncoskie
Attorney, Agent, or Firm—Robert A. Ostmann

[57] ABSTRACT

Process for the manufacture of quick-dissolving powder products from pulse vegetables wherein the dry legumes are firstly so finely milled under dry conditions that even the shells (Exosperm) are disintegrated and inseparable from flour. Next, the milled legume is mixed with α-amylase and water to form a suspension which is submitted to a continuous process consisting successively of a short, intensive boiling phase, and reactions phase to decompose at least a part of the starch in the boiled suspension by the α-amylase, and then a drying phase.

9 Claims, 1 Drawing Figure

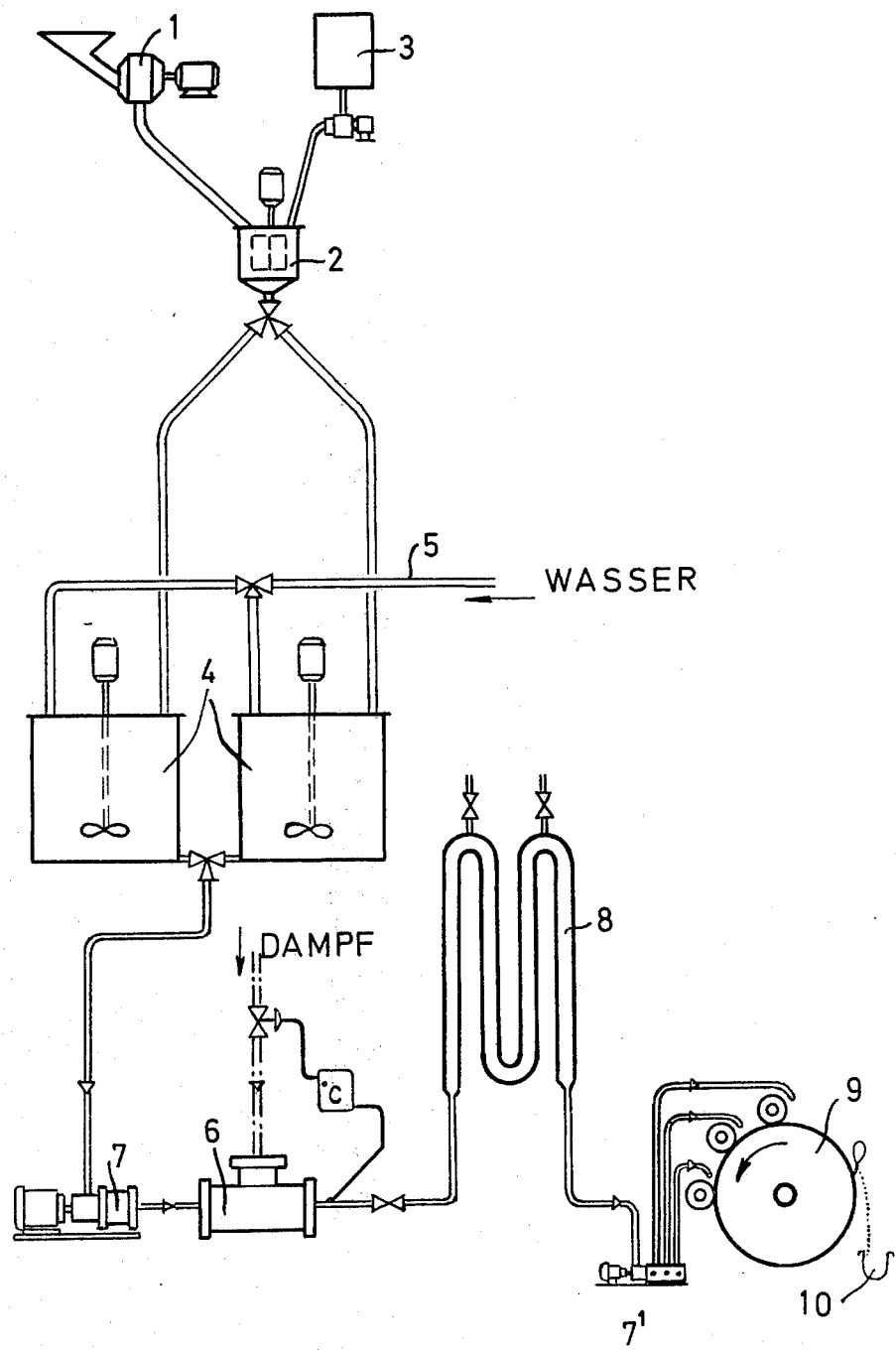

MANUFACTURING OF INSTANT PRODUCTS FROM LEGUMES

BACKGROUND OF THE INVENTION

The invention relates to a process for manufacturing quick dissolving powder products, i.e. instant products, derived from pulse vegetables, i.e. legumes.

Formerly, such instant products were manufactured from legumes i.e. using pulses as a basis, as follows: Dry pulses e.g. dried beans or peas were mixed with water and boiled for several hours. The boiled shells were then either crushed and homogenized to a pulp which was dried on a roller drier and finally crushed to flakes or powder, or another process was used and the boiled pulses were firstly dried in a shelf-drier and finally pulverized.

The former processes had the following disadvantages: The lengthy process of working in batches is expensive and requires much manual work. The long boiling time of several hours is necessary on the one hand to reduce the bitter substances with the aid of enzymes contained in the pulses. On the other hand the flavours are considerably destroyed during the long cooking process, which detracts considerably from the quality of the product.

SUMMARY OF THE INVENTION

The object of the invention is to find a continuous process for the manufacture of quick dissolving products from legumes. The process should be relatively cheap and simple. A necessary cooking time should be short. The manual activity should be for the most part eliminated. The product manufactured according to the process should be of higher quality than the former products. In particularly, the natural flavour of the vegetable should remain in the product.

This object is achieved by the invention in that dried legumes are firstly finely milled under dry conditions so that even the shells (Exosperm) are disintegrated and inseparable from flour. Then, this milled flour is mixed with α-anylase and water to form a suspension which is subjected to a continuous process consisting successively of a short intensive boiling phase, a reaction phase in which some of the starch in the boiled suspension is decomposed by the α-amylase, and then a drying phase.

With the present short boiling time, the natural flavours remain chiefly in the product. The process is cheap and manual activity is not necessary.

In a preferred embodiment, the suspension of flour and water contains 20 to 35% by weight of dry substance, and 0.05 to 0.35% by weight of α-amylase relative to the dry substance.

Depending on the concentration the addition of α-amylase causes a part of the starch in the legumes to decompose to maltose and dextrines. The partial decomposing helps to eliminate the bitter, raw taste. Furthermore through the enzyme addition (α-amylase), the structure and viscosity of the product are considerably improved. The natural flavours of the legumes are better conserved in the quick dissolving product and impart considerable advantages of quality to the dish prepared from it e.g. a soup prepared from the quick-dissolving product, in comparison with the former quick-dissolving products.

BRIEF DESCRIPTION OF THE DRAWING

The subject of the invention is explained more clearly by means of a drawing which shows an apparatus for carrying out the process.

DESCRIPTION OF THE PREFERRED EMBODIMENTS

The legumes, i.e. pulse vegetables such as dried black beans, used as a basis for quick-dissolving product are firstly fed dry to a grinding device 1 and milled under dry conditions to a flour so fine that even the shells (Exosperm) are so disintegrated that they are inseparable from the flour. It is important to obtain such a disintegration of the exosperm so that no separation of the exosperm occurs at a later stage of the process e.g. in a later drying phase.

This milled flour, prepared in the manner described, passes into an admixing device 2, where α-amylase in the ratio of 0.05 to 0.35% by weight relative to the flour is added from a container 3 by a metering pump.

This mixture of flour and α-amylase passes into a preparation plant in which a suspension having 20 to 35% by weight of dry substance is prepared.

The plant has two containers 4 with one mixer each into which the flour and the α-amylase and water pass (through a pipe 5). The prepared suspension in the first container is fed into a continuous steam injection boiler 6. Meanwhile, in the second container a new batch of suspension is prepared. After emptying the first container, the suspension is guided from the second container into the boiler 6 etc.. It would also be possible to admix the addition of α-amylase to flour water suspension in the container 4. In any case, the addition of α-amylase must be mixed prior to the planned boiling phase.

The flour suspension with the admixed enzyme i.e. with α-amylase, is led through a steam boiler via a superposed pump 7 and continually boiled during the time it is in the boiler 6. The period in the boiler 6 is short and amounts to about 10 seconds. It is boiled at temperatures between 85° and 110° C. Boiling takes place with the introduction of steam into the suspension. During this about 2 liters of suspension per second flow through the boiler. The superposed pump is a metering pump, with the advantages of a "Mohno-pump" by which a required through put amount of the suspension is sent through the boiler. A valve is provided behind the boiler 6 to set a required counterpressure during boiling. A desired boiling temperature and/or the direct feeding of the steam into the suspension in the boiler can be adjusted by means of a regulation device located on a steam pipe in front of the boiler.

The boiled suspension passes then continuously through a reaction container in which the suspension remains for 10 to 45 minutes. Thus the boiled suspension flows continuously through the reaction container and remains therein for 10 to 45 minutes.

After this period in the reaction container 8, a part of the starch in the boiled suspension will have been decomposed by action of the α-amylase so that the bitter raw taste is eliminated and also a required structure of the end product is obtained.

The suspension passes in this state via a pump $7^1$ onto a roller drier 9, preferably a single roller drier with an overhead application roller, and is dried there. In order to achieve a deactivation of the enzyme in this phase of the process, a superficial temperature of the drier cylinder exceeding 120° C. is maintained. The dry product is finally crushed in a device 10 either to flakes or powder (flour) and then packed.

I claim:

1. A process for manufacturing a powdered, instant soup or puree product for human consumption from pulse vegetables comprising the steps of
   a. finely milling whole pulse seeds under dry conditions to such extent that the exosperm parts are disintegrated and are indiscernible and inseparable from the flour parts;
   b. mixing said finely milled pulse material with water and α-amylase to form a suspension; and
   c. continuously conveying said suspension successively through a short, intensive heating phase wherein boiling of the suspension is effected in a time period on the order of seconds so as to effect rapid hydrolysis without destroying the natural taste of the pulse material and without deactivating the α-amylase, a longer reaction phase having a duration on the order of minutes wherein decomposition of starch in the pulse material by the α-amylase continues without further heating, and a drying phase wherein the suspension is dried and the α-amylase is deactivated,
   d. the α-amylase being active throughout the entire period between its introduction and the drying phase and serving to convert a portion of the starch in the pulse material to maltose and thereby eliminate the bitter, raw taste of the pulse.

2. A process as defined in claim 1 in which said suspension contains 20 to 35% by weight of dry substance, and 0.05 to 0.35% by weight of α-amylase relative to the dry substance.

3. A process as defined in claim 1 in which heating phase comprises introducing steam into said suspension as the latter is conveyed through a steam injection boiler; and in which boiling takes place at a temperature of 85° to 100° C. and the suspension remains in the boiler for about 10 seconds.

4. A process as defined in claim 1 in which the reaction phase is carried out as said suspension is conveyed through a reaction container, and the suspension remains in the reaction container for 10 to 45 minutes.

5. A process as defined in claim 1 in which the drying phase is carried out on a roller dryer having a drier cylinder whose superficial temperature is maintained high enough to deactivate the α-amylase.

6. A process as defined in claim 5 in which the superficial temperature of the drier cylinder is maintained above 120° C.

7. A process as defined in claim 1 in which the drying phase is carried out on a single roller drier with overhead application roller.

8. A process of preparing a soup or puree for human consumption using the product produced by the process defined in any one of the preceding claims which comprises the step of mixing said product with water.

9. The product produced by the process defined in any one of claims.

* * * * *